United States Patent Office 3,014,960
Patented Dec. 26, 1961

3,014,960
PROCESS FOR MAKING 2-CYCLOPENTENE-ACETIC ACIDS
John T. Fitzpatrick and Erich Marcus, Charleston, W. Va., assignors to Union Carbide Corporation, New York, N.Y., a corporation of New York
No Drawing. Filed June 7, 1960, Ser. No. 34,393
9 Claims. (Cl. 260—514)

This invention relates to a novel process for the preparation of 2-cyclopenteneacetic acids and acid halides.

More specifically, it is an object of this invention to prepare 2-cyclopenteneacetic acids and acid halides by the reaction of a 3-halocyclopentene with ketene in the presence of a catalyst.

The process of the instant invention can be illustrated by the following equation:

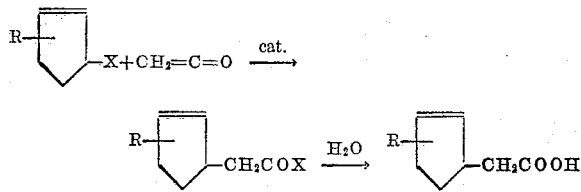

where R represents hydrogen or an alkyl group containing from 1 to 8 carbon atoms and X represents chlorine or bromine.

The catalysts which can be used in the above reaction are the Friedel-Crafts catalysts. These catalysts include zinc chloride, stannic chloride, zinc bromide, ferric chloride etc. The preferred catalyst is zinc chloride.

The amount of catalyst which can be used is not narrowly critical and can vary over a wide range. A preferred range is from about 0.01 to 10.0 percent or more by weight, based on the halocyclopentene used. A particularly preferred range of concentration is about 0.02 to 5 percent by weight, based on halocyclopentene.

The proportion of reactants is also not narrowly critical and can vary over a wide range. Molar ratios of ketene to halocyclopentene within the range of 0.5 to 2 are preferred. A particularly preferred concentration is a 1:1 molar ratio.

Although the reactants can be introduced in any fashion, the reaction is best controlled by the gradual addition of the ketene to the halocyclopentene and catalyst. The reaction can also be carried out in the presence of an inert solvent although it is not necessary to do so.

The temperature at which the reaction is conducted may vary from about —85 to +85° C. The preferred range is from —50 to +20° C. Since the reaction is exothermic, the desired temperature range must be maintained with a proper cooling bath.

The isolation of 2-cyclopenteneacetic acid from the reaction mixture can be accomplished in many ways. The reaction mixture can be hydrolyzed by the addition of boiling water and the water-insoluble 2-cyclopenteneacetic acid can then be separated and can be purified by distillation. Another method of isolating the acid is to hydrolyze the reaction product with an aqueous solution of a base such as sodium carbonate or sodium hydroxide, wash the resulting solution with a water-immiscible solvent such as benzene, ethyl ether or petroleum ether, and then acidify the basic aqueous solution to yield the 2-cyclopenteneacetic acid as a separate layer. The acid can be used in this state of purity or can be further purified by distillation.

If it is desired to isolate the intermediate cyclopenteneacetyl halide, the reaction product can be vacuum distilled without any washing. For many applications the crude cyclopenteneacetyl halide can even be used without distilling it from the reaction mixture.

2-cyclopenteneacetic acids are known in the art. They are intermediates for the preparation of agricultural and pharmaceutical chemicals. The acid derivatives, e.g., the hydrazide, are known as tuberculostatic agents and the alkamine esters are known to be antispasmodics.

The following examples illustrate the instant invention:

Example 1

Freshly distilled ketene (802 g., 19.1 moles) was added during a period of four hours with stirring to a mixture of freshly distilled 3-chlorocyclopentene (1538 g., 15.0 moles) and pulverized zinc chloride (60 g.), while the temperature was maintained between —20 and —26°. The mixture was stirred for an additional hour at the same temperature and added with stirring to 12 l. of water which contained 1240 g. of sodium hydroxide, while the temperature was maintained between 50 and 55°. After addition of 600 ml. of benzene and 400 ml. of ether, the aqueous layer was separated and acidified with 1600 ml. of concentrated hydrochloric acid. The crude cyclopenteneacetic acid was separated, and the aqueous layer was extracted with two 200 ml. portions of benzene. The crude acid and the benzene layers were combined and distilled without rectification to give 1682 g. of 2-cyclopenteneacetic acid. Redistillation through a 10" column afforded 1657 g. (88 percent yield), B.P. 80°/1.5 mm.–75°/0.7 mm.

A sample from a similar run was used for an analysis; it had the following physical properties: B.P. 77°/0.7 mm.–74°/0.5 mm., $n$ 30.5/D 1.4633, $d^{20}$ 1.044; lit. B.P. 94–95°/3 mm., $n$ 20/D 1.4682, $d^{20}$ 1.052.

Analysis.—Calcd. for $C_7H_{10}O_2$: C, 66.64; H, 7.99; neutral equiv., 126. Found: C, 67.28, 67.52; H, 8.18, 8.23; neutral equiv., 131.

Example 2

In another run the reaction mixture was washed quickly with water at 0°. A mixture of the acid, its anhydride and the chloride was obtained. 2-cyclopenteneacetyl chloride had the following physical properties: B.P. 45–48°/3.5 mm., $n$ 30/D 1.4700, $d^{24}$ 1.067; lit. B.P. 59–60°/12 mm., $n$ 21/D 1.4738.

Analysis.—Calcd. for $C_7H_9Cl_O$: C, 58.14; H, 6.27; Cl, 24.52. Found: C, 57.89; H, 6.27; Cl, 23.94.

Another fraction was identified as 2-cyclopenteneacetic anhydride, B.P. 115°/0.4 mm., $n$ 30.5/D 1.4822, $d^{20}$ 1.065.

Analysis.—Calcd. for $C_{14}H_{18}O_3$: C, 71.77; H, 7.74; neutral equiv., 117. Found: C, 71.32; H, 7.78; neutral equiv., 120.

Example 3

Ketene (59 g., 1.4 moles) was added during a period of fifty minutes with stirring to a mixture of chlorocyclopentene (102.5 g., 1.0 mole) and pulverized zinc chloride (0.05 g.), while the temperature was maintained between 0° and +5° C. The mixture was stirred for an additional thirty minutes at 0°. After distillation without rectification 134 g. (93 percent yield) of crude 2-cyclopenteneacetyl chloride was obtained, B.P. 50°/4 mm.–70°/5 mm. A residue of 15 g. remained after distillation. Redistillation through a 10" column afforded 5 g., B.P. 33°/2 mm.–48°/4 mm., and 123 g., B.P. 48°/4 mm.–55°/4.5 mm.

Example 4

The experiment was conducted under conditions similar to those of Example 3, but at a temperature of +15 to +20° C. Distillation without rectification afforded 103 g. (71 percent yield) of crude product and a residue of 36 g.

Example 5

The experiment was conducted under conditions similar to those of Example 3, but with 0.006 g. of catalyst. This time most of the ketene that had passed into the reaction mixture could be collected unchanged in a cold trap attached to the reaction flask. After ketene had been introduced for fifty minutes, only 21 g. (0.5 mole) had been absorbed by the reaction mixture. Distillation without rectification gave 58 g. (57 percent of recovered starting material) up to 50° at 20 mm., 53 g. (37 percent yield), B.P. 50°/20 mm.-65°/3 mm., of product which contained some unchanged chlorocyclopentene, and a residue of 3.6 g.

Example 6

Ketene (32 g., 0.76 mole) was added during a period of twenty minutes with stirring to a mixture of chlorocyclopentene (20.5 g., 0.2 mole), pulverized zinc chloride (0.026 g.), and benzene (80 ml.), while the temperature was maintained between 45 and 50° C. Workup of the reaction mixture afforded 3.6 g. (14 percent yield) of 2-cyclopenteneacetic acid.

Example 7

The experiment was conducted under conditions similar to those of Example 6, but at 70 to 80° C. instead of 45 to 50° C. 2-cyclopenteneacetic acid could be isolated in a 2 percent yield.

Example 8

Hydrogen bromide (165 g., 2.0 moles) was added during a period of about one hour with stirring to cyclopentadiene (132 g., 2.0 moles), while the temperature was maintained at about 0° C. After addition of pulverized zinc chloride (0.5 g.) to the crude 3-bromocyclopentene, ketene (82 g., 1.95 moles) was added during a period of fifty-five minutes while the temperature was held at about 0° C. The mixture was stirred for an additional thirty minutes at the same temperature. One-fifth (76 g.) of the reaction mixture was distilled without rectification to give 51 g. (67 percent yield) of crude 2-cyclopenteneacetyl bromide. Redistillation through a Vigreux column gave a purified sample, B.P. 47°/1 mm., $d^{22}$ 1.376, $n_D^{20}$ 1.5071.

*Analysis.*—Calcd. for $C_7H_9BrO$: C, 44.40; H, 4.79; Br, 42.20. Found: C, 44.48; H, 4.79; Br, 42.06.

The remainder (304 g.) of the reaction product was worked up to give the expected 2-cyclopenteneacetic acid.

Example 9

The experiment was conducted under conditions similar to those of Example 3, but with 0.03 g. of stannic chloride instead of zinc chloride. The stannic chloride had been dissolved in 3 ml. of methylene chloride and was added in this form dropwise to the chlorocyclopentene. After ketene had been introduced for thirty-five minutes, only 9 g. (0.2 mole) had been absorbed by the reaction mixture. Workup gave a 4 percent yield of 2-cyclopenteneacetic acid.

Example 10

3-chloro(methylcyclopentene) (73 g., 0.63 mole) was prepared by the addition of a calculated amount of gaseous hydrogen chloride to methylcyclopentadiene (50 g., 0.63 mole) at —80°. Since the reaction is highly exothermic, the hydrogen chloride must be added very slowly. The resulting compound is a mixture of isomers.

Ketene (85 g., 2.0 mole) was added during a period of about one hour with stirring to a mixture of 3-chloro (methylcyclopentene) (73 g., 0.63 mole) and pulverized zinc chloride (0.44 g.), while the temperature was maintained between —80° and —40° C. The mixture was stirred for an additional thirty minutes at —80° C. The reaction mixture was added dropwise to a 10 percent sodium hydroxide solution. After extraction with petroleum ether (B.P. 35–37°), the aqueous caustic layer was acidified with hydrochloric acid. The crude methylcyclopenteneacetic acid was separated, and the acidic aqueous layer was extracted with petroleum ether (B.P. 35–37°). The crude acid and the last ether layer were combined and distilled on a gooseneck to give 56 g. (63 percent yield) of crude methyl-2-cyclopenteneacetic acid. Redistillation through a Vigreux column afforded a sample for analysis, B.P. 87–90°/0.2 mm., $n_D^{20}$ 1.4691, $d^{20}$ 1.018.

*Analysis.*—Calcd. for $C_8H_{12}O_2$: C, 68.54; H, 8.63; $M_D$, 38.02; neutral equiv., 140. Found: C, 69.29; H, 8.76, $M_D$, 38.4; neutral equiv., 142.

What is claimed is:

1. A process which comprises reacting in the presence of a Friedel-Crafts catalyst a 3-halocyclopentene having the formula:

wherein R is selected from the class consisting of hydrogen and alkyl groups containing from 1 to 8 carbon atoms and X is selected from the class consisting of bromine and chlorine with ketene at a temperature from —85° to +85° C.

2. The process of claim 1 wherein the reaction product is hydrolyzed to yield the 2-cyclopenteneacetic acids.

3. The process of claim 1 in which the ketene and the 3-halocyclopentene are present in a 1:1 molar ratio.

4. A process according to claim 1 in which the catalyst is zinc chloride.

5. The process of claim 1 wherein the temperature is from —50 to +20° C.

6. A process for the production of 2-cyclopenteneacetic acid which comprises adding ketene to a mixture of 3-chlorocyclopentene and a Friedel-Crafts catalyst maintained at a temperature of from —85 to +85° C. and hydrolyzing the reaction mixture.

7. The process of claim 6 in which the ketene and 3-chlorocyclopentene are added in a 1:1 molar ratio.

8. The process of claim 7 in which the catalyst is zinc chloride.

9. The process of claim 8 in which the temperature is from —50 to +20 C.

No references cited.